US012671861B2

(12) United States Patent
Kim et al.

(10) Patent No.: US 12,671,861 B2
(45) Date of Patent: Jun. 30, 2026

(54) ELECTRONIC DEVICE FOR CONTROLLING A PLURALITY OF SOURCE DEVICES AND CONTROLLING METHOD THEREOF

(71) Applicant: SAMSUNG ELECTRONICS CO., LTD., Suwon-si (KR)

(72) Inventors: Hyunseok Kim, Suwon-si (KR); Gukhyun Ryu, Suwon-si (KR); Kideok Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/821,457

(22) Filed: Aug. 30, 2024

(65) Prior Publication Data

US 2025/0030912 A1     Jan. 23, 2025

Related U.S. Application Data

(63) Continuation of application No. PCT/KR2024/010299, filed on Jul. 17, 2024.

(30) Foreign Application Priority Data

Jul. 21, 2023     (KR) ........................ 10-2023-0095216

(51) Int. Cl.
*H04N 21/4363* (2011.01)
*H04N 21/422* (2011.01)
(Continued)

(52) U.S. Cl.
CPC ..... *H04N 21/4363* (2013.01); *H04N 21/4222* (2013.01); *H04N 21/4312* (2013.01); *H04N 21/4622* (2013.01)

(58) Field of Classification Search
CPC ............. G06V 20/52; G08B 13/19645; H04N 21/4363; H04N 21/4222; H04N 21/4312; H04N 21/4622
See application file for complete search history.

(56) References Cited

U.S. PATENT DOCUMENTS 8,539,528 B2 *   9/2013   Klosterman ........... H04N 7/163
                                                            725/49
8,847,889 B2     9/2014   Tuan et al.
(Continued)

FOREIGN PATENT DOCUMENTS

CN          2609031 Y      3/2004
CN       102012753 A       4/2011
(Continued)

OTHER PUBLICATIONS

Written Opinion issued on Oct. 24, 2024 for International Application No. PCT/KR2024/010299.
(Continued)

*Primary Examiner* — Fernando Alcon
(74) *Attorney, Agent, or Firm* — STAAS & HALSEY LLP

(57) ABSTRACT

An electronic device is provided. The electronic device includes a display, a communication interface configured to perform communication with a plurality of source devices, and one or more processors configured to control the display to display an image signal received from each of the plurality of source devices, according to a predetermined signal received from an input device, control the communication interface so that the communication interface that transmits a control signal received from the input device to a first source device from among the plurality of source devices transmits the control signal to a second source device, based on the control signal being received from the input device according to a user input regarding the input device, transmit the control signal to the second source device, and based on an image signal reflecting the user input being received, control the display to display the received image signal.

20 Claims, 11 Drawing Sheets

(51) Int. Cl.
    *H04N 21/431*      (2011.01)
    *H04N 21/462*      (2011.01)

(56)       References Cited

U.S. PATENT DOCUMENTS

| | | | |
|---|---|---|---|
| 10,025,484 B2 | 7/2018 | Liu et al. | |
| 10,564,835 B2 | 2/2020 | Yan et al. | |
| 10,565,153 B2 * | 2/2020 | Kashyap | G06F 9/4411 |
| 10,924,794 B2 | 2/2021 | Lim et al. | |
| 11,302,282 B2 | 4/2022 | Kang | |
| 11,544,083 B2 | 1/2023 | Kang | |
| 12,260,141 B2 | 3/2025 | Kim et al. | |
| 2003/0071902 A1 * | 4/2003 | Allen | H04N 7/181 |
| | | | 348/E7.071 |
| 2006/0066716 A1 * | 3/2006 | Chang | H03J 1/0025 |
| | | | 348/E5.103 |
| 2006/0271968 A1 * | 11/2006 | Zellner | H04N 21/42204 |
| | | | 725/81 |
| 2008/0036741 A1 | 2/2008 | Hsieh et al. | |
| 2008/0129692 A1 | 6/2008 | Sween et al. | |
| 2009/0021651 A1 * | 1/2009 | Pratt | H04N 21/43615 |
| | | | 348/734 |
| 2009/0244391 A1 * | 10/2009 | Kitami | H04N 21/436 |
| | | | 348/E5.057 |
| 2010/0157168 A1 * | 6/2010 | Dunton | H04N 21/42209 |
| | | | 455/3.06 |
| 2010/0318917 A1 * | 12/2010 | Holladay | H04L 41/0895 |
| | | | 715/810 |
| 2012/0084662 A1 * | 4/2012 | Navarro | H04N 21/47 |
| | | | 715/740 |
| 2012/0090004 A1 * | 4/2012 | Jeong | H04N 21/4312 |
| | | | 725/39 |
| 2015/0067602 A1 | 3/2015 | Bernstein et al. | |
| 2015/0169162 A1 | 6/2015 | Liu et al. | |
| 2016/0140075 A1 * | 5/2016 | Kashyap | G06F 13/4265 |
| | | | 710/104 |
| 2017/0255350 A1 * | 9/2017 | Yu | H04N 21/4316 |
| 2017/0272681 A1 * | 9/2017 | Oh | G08C 17/02 |
| 2018/0027295 A1 * | 1/2018 | Lee | H04N 21/4345 |
| | | | 725/139 |
| 2018/0070137 A1 * | 3/2018 | Kao | G09G 5/00 |
| 2018/0113579 A1 * | 4/2018 | Johnston | H04N 21/47217 |
| 2018/0278999 A1 * | 9/2018 | David | H04N 21/42203 |
| 2018/0292961 A1 | 10/2018 | Yan et al. | |
| 2020/0275225 A1 * | 8/2020 | Proctor, Jr. | H04N 21/8106 |
| 2020/0364023 A1 * | 11/2020 | Dai | H04N 21/422 |
| 2020/0409726 A1 | 12/2020 | Kang | |
| 2020/0410954 A1 | 12/2020 | Kang | |
| 2020/0413150 A1 | 12/2020 | Kang | |
| 2021/0021904 A1 * | 1/2021 | Kim | H04N 21/422 |
| 2021/0195285 A1 * | 6/2021 | Lee | H04N 21/23103 |
| 2021/0345014 A1 * | 11/2021 | Heo | G06F 3/0346 |
| 2022/0078552 A1 * | 3/2022 | Delhoume | H04N 21/43076 |
| 2022/0141523 A1 * | 5/2022 | Romey | H04N 21/4305 |
| | | | 725/86 |
| 2023/0076723 A1 * | 3/2023 | Hamamoto | H04N 5/268 |
| 2023/0154439 A1 * | 5/2023 | Yi | H04N 21/42221 |
| 2023/0350627 A1 | 11/2023 | Jeon et al. | |
| 2024/0022780 A1 * | 1/2024 | Pian | G06F 9/451 |

FOREIGN PATENT DOCUMENTS

| | | |
|---|---|---|
| KR | 10-0519442 | 10/2005 |
| KR | 10-2012-0098721 | 9/2012 |
| KR | 10-2015-0047592 | 5/2015 |
| KR | 10-2019-0041690 | 4/2019 |
| KR | 10-2021-0001867 | 1/2021 |
| KR | 10-2022-0005902 | 1/2022 |
| KR | 10-2022-0100437 | 7/2022 |
| KR | 10-2022-0101485 | 7/2022 |

OTHER PUBLICATIONS

International Search Report issued on Oct. 24, 2024 for International Application No. PCT/KR2024/010299.

* cited by examiner

<PREDETERMINED SIGNAL>

<PREDETERMINED SIGNAL>

ELECTRONIC DEVICE FOR CONTROLLING A PLURALITY OF SOURCE DEVICES AND CONTROLLING METHOD THEREOF

CROSS-REFERENCE TO RELATED APPLICATION(S)

This application is a bypass continuation of International Application No. PCT/KR2024/010299, filed on Jul. 17, 2024, which is based on and claims priority to Korean Patent Application No. 10-2023-0095216, filed on Jul. 21, 2023, in the Korean Intellectual Property Office, the disclosures of which are incorporated by reference herein in their entireties.

BACKGROUND

1. Field

The present disclosure relates to an electronic device and a controlling method thereof, and more particularly, to an electronic device for controlling a plurality of source devices through an input device and a controlling method thereof.

2. Description of Related Art

Recently, various home appliance products have been developed and popularized and especially, the development and popularization of display devices, source devices, and the like have been more active than any other field.

Consumers have multiple display devices and multiple source devices in their homes, and they are struggling with how to control them.

For example, in order to control multiple source devices individually, an input device (or control device) must be connected to each of the source devices, which increases the number of input devices required in the home.

Furthermore, the process of finding the input device associated with the source device that the user wants to control, from among the input devices, can cause inconvenience to the user.

There has been a need for a way to control multiple source devices with a single input device, without the user having to find a specific input device (the input device associated with the source device that the user wants to control) from among a plurality of input devices, even when the source device that the user wants to control changes, and a way to easily switch from the source devices to the source device that the user wants to control.

SUMMARY

Aspects of embodiments of the disclosure will be set forth in part in the description which follows and, in part, will be apparent from the description, or may be learned by practice of the presented embodiments.

An electronic device according to an embodiment includes a display, a communication interface configured to perform communication with a plurality of source devices, and one or more processors configured to control the display to display an image signal received from each of the plurality of source devices, according to a predetermined signal received from an input device, control the communication interface so that the communication interface that transmits a control signal received from the input device to a first source device from among the plurality of source devices transmits the control signal to a second source device, based on the control signal being received from the input device according to a user input regarding the input device, transmit the control signal to the second source device, and based on an image signal reflecting the user input being received, control the display to display the received image signal.

A controlling method of an electronic device according to an embodiment includes displaying an image signal received from each of the plurality of source devices, according to a predetermined signal received from an input device, transmitting a control signal received from the input device transmitted to a first source device from among the plurality of source devices, to a second source device, and based on the control signal received from the input device being transmitted to the second source device according to a user input regarding the input device and an image signal reflecting the user input being received from the second source device, displaying the received image signal.

In a computer-readable recording medium including a program that executes a controlling method of an electronic device according to an embodiment, the controlling method of the electronic device includes displaying an image signal received from each of the plurality of source devices, according to a predetermined signal received from an input device, transmitting a control signal received from the input device transmitted to a first source device from among the plurality of source devices, to a second source device, and based on the control signal received from the input device being transmitted to the second source device according to a user input regarding the input device and an image signal reflecting the user input being received from the second source device, displaying the received image signal.

According to an embodiment of the disclosure, an electronic device includes a display configured to simultaneously display image signals received from a plurality of source devices; a communication interface which is controllable to be in a plurality of configurations to respectively transmit control signals received from an input device to the plurality of source devices and so that, when the communication interface is in a respective configuration of the plurality of configurations to transmit control signals received from the input device to a respective source device of the plurality of source devices, the communication interface does not transmit the control signals received from the input device to other source devices of the plurality of source devices; and at least one processor configured to, when the display is simultaneously displaying image signals received from a first source device of the plurality of source devices and a second source device of the plurality of source devices and the communication interface is in a first configuration of the plurality of configurations to transmit control signals received from the input device to the first source device and not the second source device, and a predetermined signal is received from the input device, control the communication interface to be in a second configuration of the plurality of configurations so that the communication interface transmits control signals received from the input device to the second source device and not the first source device, and, based on a control signal being received from the input device when the communication interface is in the second configuration, control the communication interface to transmit the control signal to the second source device.

BRIEF DESCRIPTION OF THE DRAWINGS

These and/or other embodiments of the disclosure will become apparent and more readily appreciated from the following description of the embodiments, taken in conjunction with the accompanying drawings of which.

DETAILED DESCRIPTION

The present disclosure will be described in more detail below with reference to the accompanying drawings.

The terms used in the embodiments of the present disclosure have been chosen to be as generic as possible in current common usage while considering the features of the disclosure, but may vary depending on the intent or precedent of those skilled in the art, the emergence of new technologies, etc. In addition, in certain cases, the terms have been chosen arbitrarily by the applicant, in which case their meaning will be described in detail in the corresponding description of the disclosure. Accordingly, terms used in this disclosure should be defined based on their meaning and the context of the disclosure as a whole, and not merely on their designation.

In this specification, expressions such as "has," "may have," "includes," or "may comprise" refer to the presence of a feature (e.g., a numerical, functional, behavioral, or component aspect) and do not exclude the presence of additional features.

The expression at least one of A and/or B should be understood to refer to either "A" or "B" or "A and B".

As used herein, the expressions "first," "second," "first," or "second," and the like may refer to various components regardless of their sequence and/or importance, and are used only to distinguish one component from another and are not intended to limit such components.

When a component (e.g., a first component) is referred to as being "operatively or communicatively coupled with/to" or "connected to" another component (e.g., a second component), it is to be understood that the component may be directly connected to the other component, or may be connected through another component (e.g., a third component).

Expressions in the singular include the plural unless the context clearly indicates otherwise. In this application, the terms "comprising" or "consisting of" and the like are intended to designate the presence of the features, numbers, steps, actions, components, parts, or combinations thereof described in the specification, and are not to be understood as precluding the possibility of the presence or addition of one or more other features, numbers, steps, actions, components, parts, or combinations thereof.

As used herein, a "module" or "part" performs at least one function or operation and may be implemented in hardware or software, or a combination of hardware and software. Further, a plurality of "modules" or a plurality of "parts" may be integrated into at least one module and implemented on at least one processor (not shown), except for those "modules" or "parts" that need to be implemented on specific hardware.

In the present disclosure, the term 'user' may refer to a person using an electronic device or a device using an electronic device (e.g., an artificial intelligence electronic device).

Hereinafter, an embodiment of the present disclosure will be described in greater detail with reference to the accompanying drawings.

Figure 1:
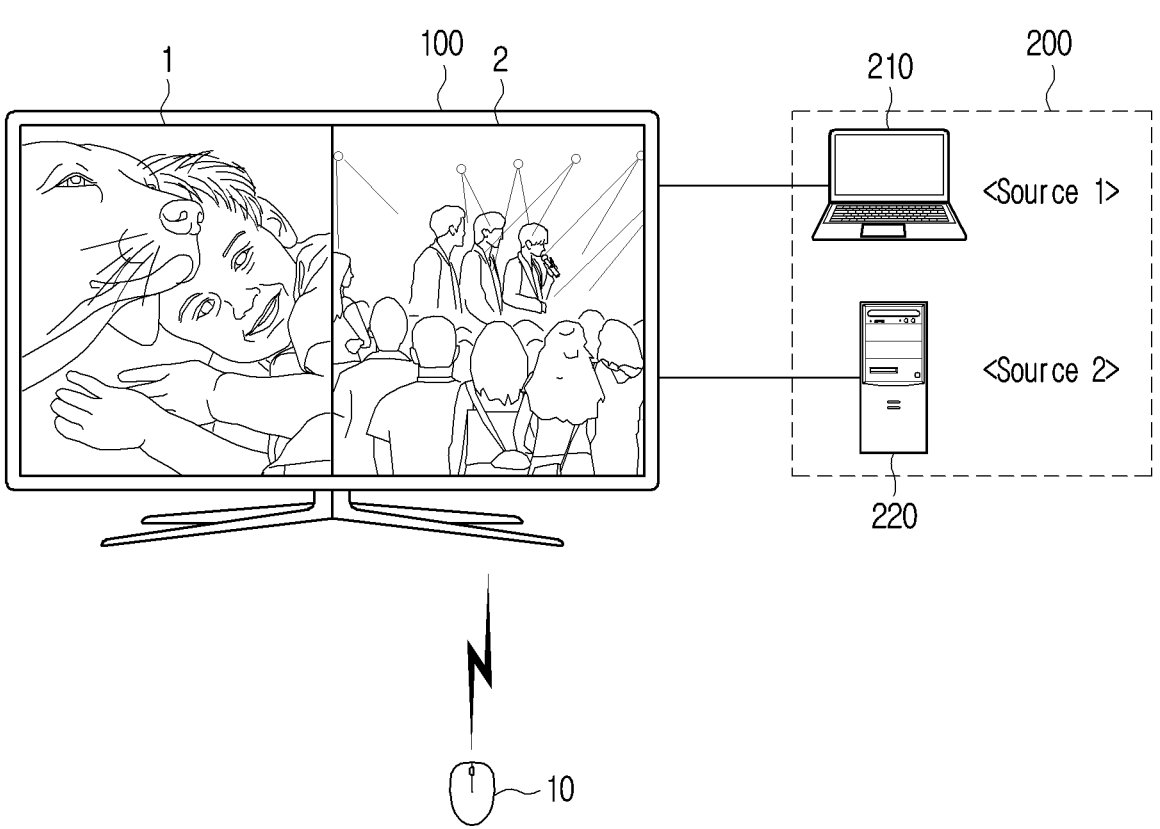
FIG. 1 is a view provided to explain an electronic device that receives a control signal from an input device according to an embodiment.

FIG. 1 is a view provided to explain an electronic device that receives a control signal from an input device according to an embodiment.

Referring to FIG. 1, an electronic device 100 according to an embodiment may display content. The electronic device 100 may be implemented as a television, but is not limited thereto, and may be any device with display capabilities, such as a video wall, large format display (LFD), digital signage, digital information display (DID), projector display, or the like. Further, the electronic device 100 may include various types of displays, such as liquid crystal displays (LCDs), organic light-emitting diodes (OLEDs), liquid crystal on silicon (LCoS), digital light processing (DLP), quantum dot (QD) display panels, quantum dot light-emitting diodes (QLEDs), and the like.

However, the electronic device is not limited thereto, and the electronic device 100 may be implemented as various types of output devices. For example, the electronic device 100 may be implemented as a user terminal device or as an acoustic output device (e.g., a sound bar, home theater system, room speakers, headphones, earphones, etc.).

The electronic device 100 according to an embodiment may receive an image signal (or, content) from a source device 200, and may output the received image signal. Here, the image signal includes an image signal, an audio signal, and the like, and for convenience of explanation, it is assumed that the electronic device 100 is implemented as a display device and displays a screen corresponding to the image signal received from the source device 200.

The source device 200 according to one example may be implemented as an electronic device, such as a set-top box, a cloud server, an over-the-top media service server, a streaming service (e.g., Samsung Gaming Hub), a home automation control panel, a security control panel, a media box (e.g., Samsung HomeSync™, Apple TV™, or Google TV™), a game console (e.g., Xbox™, PlayStation™, Switch™), an electronic dictionary, an electronic key, a camcorder, or an electronic picture frame. However, the present disclosure is not limited thereto, and the source device 200 may include at least one of a television, a user terminal device, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a virtual reality (VR) implementation device, or a wearable device. Here, the wearable device may include at least one of an accessory type of a device (e.g., a timepiece, a ring, a bracelet, an anklet, a necklace, glasses, a contact lens, or a head-mounted-device (HMD)), one-piece fabric or clothes type of a circuit (e.g., electronic clothes), a body-attached type of a circuit (e.g., a skin pad or a tattoo), or a bio-implantable type of a circuit.

According to an embodiment, the electronic device 100 may receive content from each of a plurality of source devices 200, and display a plurality of screens corresponding to the received content. Referring to FIG. 1, the electronic device 100 may display a first screen (1) corresponding to content received from a first source device 210, and display a second screen (2) corresponding to content received from a second source device 220. For example, the electronic device 100 may simultaneously display the first screen (1) received from the first source device 210 and the second screen (2) received from the second source device 220 in a picture by picture (PBP) mode. However, the present disclosure is not limited thereto, and the electronic device 100 may simultaneously display the first screen (1) received from the first source device 210 and the second screen (2) received from the second source device 220 in a picture in picture (PIP) mode.

The electronic device 100 according to an embodiment may receive a user input from an input device 10.

For example, the input device 10 may be implemented as a mouse, keyboard, remote control device, game pad, camera, and microphone to receive a user input. However, of course, this is an example and the input device is not limited thereto. For example, the input device 10 may be provided in the electronic device 100, and may be implemented as a touch screen capable of performing both a display function and an input function.

Referring to FIG. 1, the electronic device 100 may receive a control signal from the input device 10. Here, the control signal may include various forms of user input.

For example, if the input device 10 is implemented as a mouse, the control signal may include coordinate information according to the movement of the mouse, operation information for buttons provided on the mouse (e.g., click, double click, drag, etc.), etc., if the input device 10 is implemented as a camera, the control signal may include shooting information (e.g., face recognition information, iris recognition information, etc.), etc., and if the input device 10 is implemented as a microphone, the control signal may include user voice information, etc. However, this is only an example, and the form of the control signal is of course not limited to the above-described examples.

As shown in FIG. 1, each of the plurality of source devices 200 may be connected to the electronic device 100. In order to individually control each of the plurality of source devices 200, the input device 10 may be connected to each of the plurality of source devices 200, but it may be difficult to provide as many input devices 10 as there are source devices 200 (e.g., due to space limitations), Even if the input device 10 is connected to each of the plurality of source devices 200, in order to control a specific source device (e.g., a first source device 210) from among the plurality of source devices 200, it is inconvenient for a user to find a specific input device connected to a specific source device (e.g., an input device connected to the first source device 210) from among the plurality of input devices 10.

According to an embodiment, the electronic device 100 may perform communication with the input device 10 and transmit a control received from the input device 10 to any one of the plurality of source devices 200. Thus, one input device 10 may control a plurality of source devices 200 connected to the electronic device 100.

According to an embodiment, the electronic device 100 may identify one source device for transmitting the control signal received from the input device 10 from among the plurality of source devices 200, based on user intent, and may transmit the control signal to the identified one source device, which will be described in greater detail with reference to FIG. 2.

Figure 2:
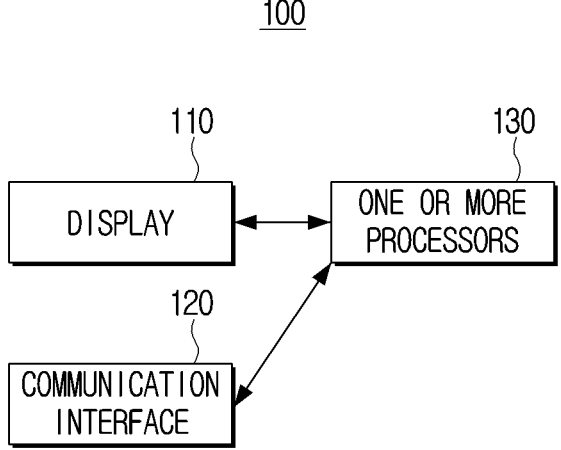
FIG. 2 is a block diagram provided to explain a configuration of an electronic device according to an embodiment.

FIG. 2 is a block diagram provided to explain a configuration of an electronic device according to an embodiment.

Referring to FIG. 2, the electronic device 100 may include a display 110, a communication interface 120, and one or more processors 130.

The display 110 according to an embodiment may be implemented as a display in various forms, such as a liquid crystal display (LCD), organic light-emitting diode (OLED), liquid crystal on silicon (LCoS), digital light processing (DLP), quantum dot (QD) display panel, quantum dot light-emitting diodes (QLEDs), micro light-emitting diodes (μLEDs), Mini LEDs, and the like. The display 110 may also be implemented as a touch screen coupled with a touch sensor, a flexible display, a rollable display, a three-dimensional display (a 3D display), a display in which a plurality of display modules are physically connected, and the like.

The communication interface 120 according to an embodiment may include wired or wireless input/output interfaces (or, input/output terminals) according to various standards. For example, the communication interface 120 may include a High Definition Multimedia Interface (HDMI), Mobile High-Definition Link (MHL), Universal Serial Bus (USB), Display Port (DP), Thunderbolt, Video Graphics Array (VGA) port, RGB port, D-subminiature (D-SUB), Digital Visual Interface (DVI) AP-based Wi-Fi (Wi-Fi, Wireless LAN network), Bluetooth, Zigbee, wired/wireless local area network (LAN), wide area network (WAN), Ethernet, IEEE 1394, Audio Engineering Society/European Broadcasting Union (AES/EBU), optical, coaxial, and the like.

According to an embodiment, the communication interface 120 includes a plurality of input/output interfaces, and may perform communication with the first source device 210 through a first terminal (e.g., a USB 1 port) and with the second source device 220 through a second terminal (e.g., a USB 2 port) from among the plurality of input/output interfaces.

However, this is only an example, and the communication interface 120 may perform communication with some of the plurality of source devices 200 via wire and perform communication with the remaining source devices wirelessly. For example, the communication interface 120 may perform communication with the first source device 210 via a wired input/output interface (e.g., USB port, HDMI port, etc.) and perform communication with the second source device 220 via a wireless input/output interface (e.g., Wi-Fi, Bluetooth, wireless MHL, etc.).

The one or more processors 130 according to an embodiment may control the display 110 to display a screen received from each of the plurality of source devices 200 through the communication interface 120.

The one or more processors 130 according to an embodiment may control the overall operations of the electronic device 100.

According to an embodiment, the one or more processors 130 may be implemented as digital signal processors (DSPs), microprocessors, timing controllers (TCONs), etc., that process digital signals. However, the processor 130 is not limited thereto, and may include one or more of a central processing unit (CPU), a microcontroller unit (MCU), a micro processing unit (MPU), a controller, an application processor (AP), or a communication processor (CP), an ARM processor, an artificial intelligence (AI) processor, or defined by such terms. The processor 130 may also be implemented as a system on chip (SoC), large scale integration (LSI), or field programmable gate array (FPGA) with embedded processing algorithms. The processor 130 may perform various functions by executing computer executable instructions stored in a memory.

In particular, the one or more processors 130 may receive a control signal from the input device 10 through a wired or wireless communication interface (not shown) and transmit the received control signal to one of the plurality of source devices 200.

For example, the one or more processors 130 may display a first screen (1) corresponding to the first source device 210 and a second screen (2) corresponding to the second source device 220, and when receiving a control signal from the input device 10, may transmit the received control signal to the source device of either of the first source device 210 and the second source device 220.

Figure 3:
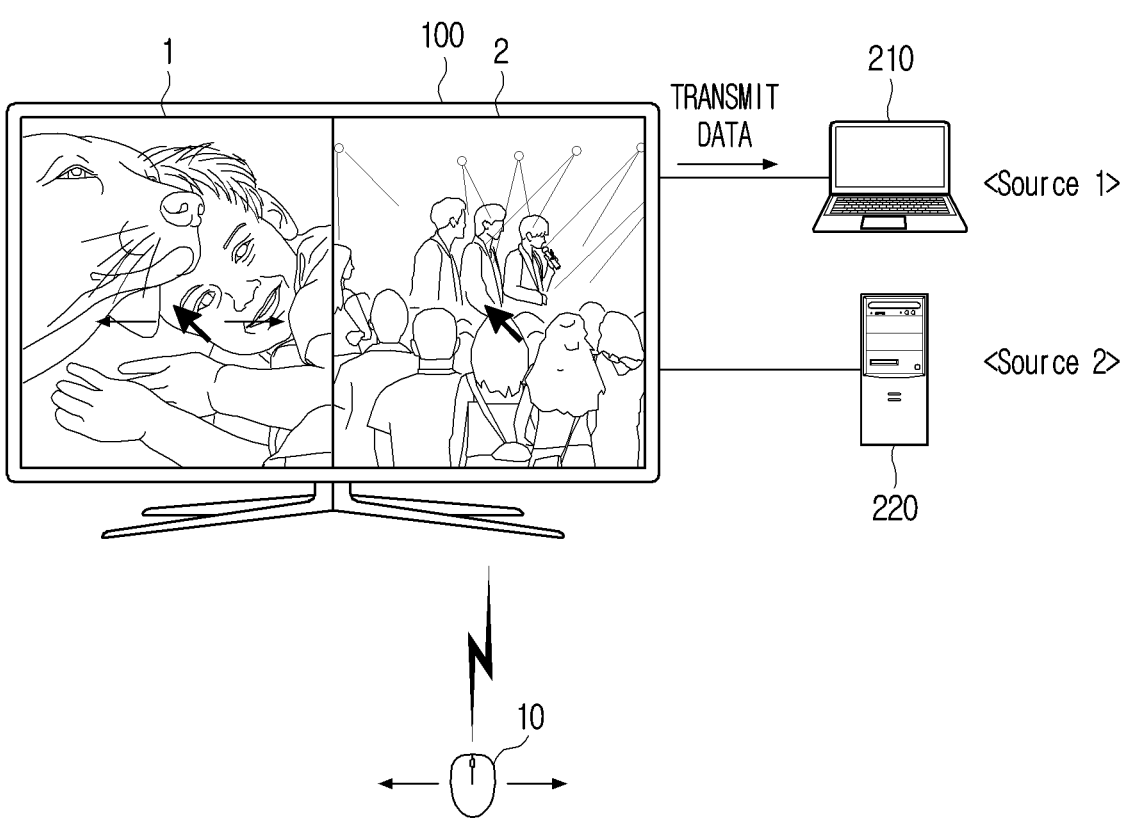
FIG. 3 is a view provided to explain an electronic device that transmits a control signal to one of a plurality of source devices according to an embodiment.

The specific description of the above will be provided with reference to FIG. 3.

FIG. 3 is a view provided to explain an electronic device that transmits a control signal to one of a plurality of source devices according to an embodiment.

Referring to FIG. 3, the one or more processors 130 may display the first screen (1) received from the first source device 210 in a first area of the display 110, and the second screen (2) received from the second source device 220 in a second area of the display 110.

According to an embodiment, the input device 10 may include a mouse, and the electronic device 100 may receive a control signal from the mouse in response to a user input to the mouse. The one or more processors 130 may transmit the control signal received from the mouse to any one of the first source device 210 and the second source device 220.
<Case 1>

According to an embodiment, the one or more processors 130 may transmit a control signal to the first source device 210 if the first source device 210 is connected to the electronic device 100 before the second source device 220 (or if the first source device 210 has initiated communication with the electronic device 100 before the second source device 220).
<Case 2>

According to an embodiment, the one or more processors 130 may transmit a control signal to the first source device 210 if the first source device 210 is connected to the electronic device 100 later than the second source device 220 (or if the first source device 210 initiated communication with the electronic device 100 later than the second source device 220).
<Case 3>

According to an embodiment, the one or more processors 130 may transmit a control signal received from the input device 10 to either one of the first source device 210 and the second source device 220 based on a prioritization (or initial setting) of the plurality of input/output interfaces included in the communication interface 120. For example, when the one or more processors 130 perform communication with the first source device 210 through a first terminal (e.g., USB 1 Port) from among the plurality of input/output interfaces and the second source device 220 through a second terminal (e.g., USB 2 Port), the one or more processors 130 may transmit a control signal to the first source device 210 that performs communication through the first terminal according to the priority.
<Case 4>

According to an embodiment, if a control signal received from the input device 10 is transmitted to the first source device 210 prior to (or just prior to) the turn-off (or standby mode) of the electronic device 100, the one or more processors 130 may transmit the control signal to the first source device 210.

As shown in FIG. 3, the one or more processors 130 may transmit a control signal received from the input device 10 to the first source device 210, and in response to a user input to the input device 10, a pointer on the first screen (1) corresponding to the first source device 210 may be controlled. According to an embodiment, the one or more processors 130 may receive a control signal from the input device 10 in response to a user input to the input device 10, and if an image signal reflecting the user input is received from the first source device 210 after transmitting the control signal to the first source device 210, may display the received signal.

Here, the image signal reflecting the user input may refer to an image signal comprising a pointer (or a repositioned pointer) controlled according to a control signal received from the electronic device 100.

However, this is only an example, and when the input device is implemented as a camera, the one or more processors 130 may transmit photographing information received from the camera to the first source device 210, and the first source device 210 may perform an operation (e.g., disable security) based on the photographing information.

Further, when the input device is implemented as a microphone, the one or more processors 130 may transmit user voice information received from the microphone to the first source device 210, and the first source device 210 may recognize a control command corresponding to the user voice information and perform an operation according to the recognized control command.

Figure 4:
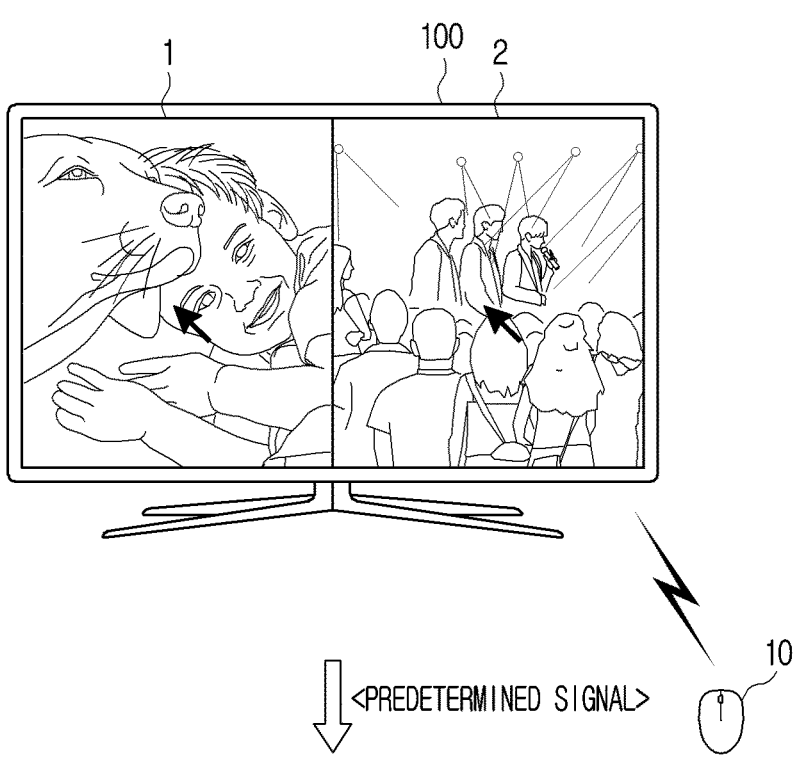
FIG. 4 is a view provided to explain an electronic device that changes a source device for transmitting a control signal according to an embodiment.
Figure 4:
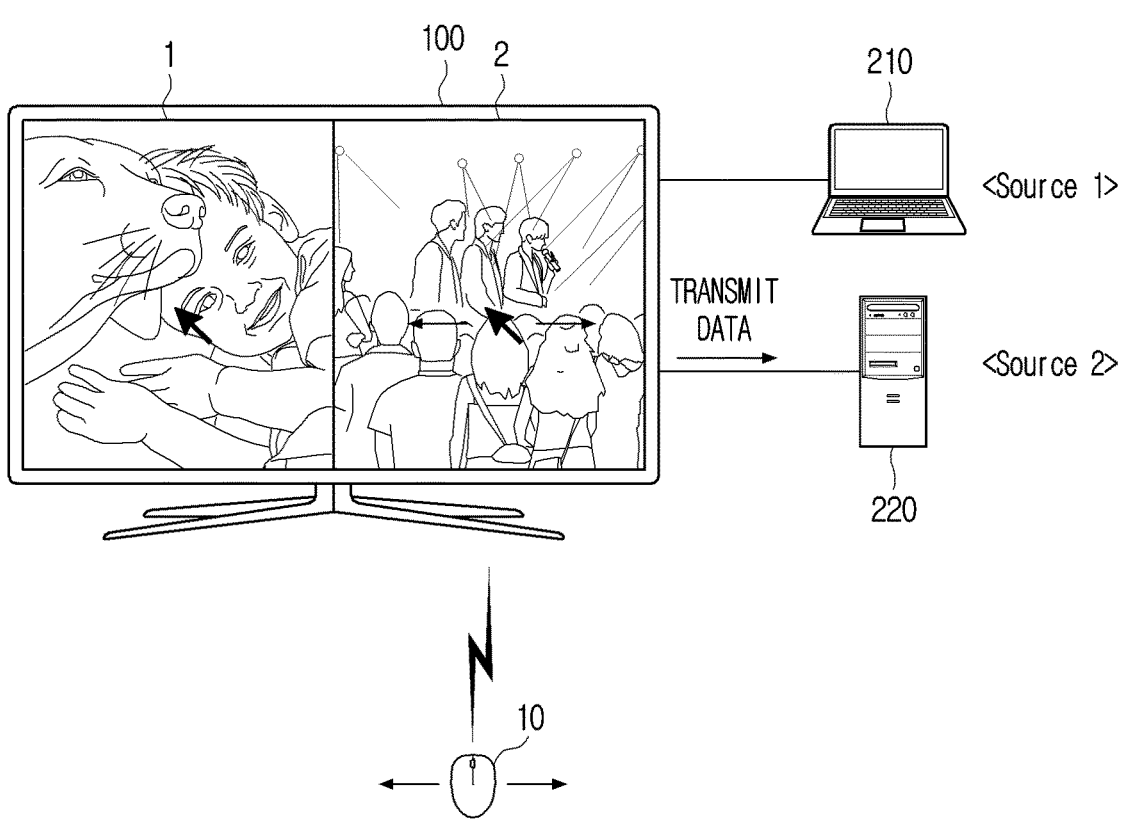

FIG. 4 is a view provided to explain an electronic device that changes a source device for transmitting a control signal according to an embodiment.

When a predetermined signal is received from the input device 10, the one or more processors 130 according to an embodiment may identify, based on the predetermined signal, one of the plurality of source devices 200 for transmitting the control signal received from the input device 10.

For example, as shown in FIG. 4, when a predetermined signal is received while a control signal received from the input device 10 is transmitted to the first source device 210, the one or more processors 130 may sequentially change the source device for transmitting the control signal from the first source device 210 to the second source device 220.

According to an embodiment, the one or more processors 130 may transmit the control signal received from the input device 10 after the predetermined signal is received, to the second source device 220, and in response to a user input to the input device 10, a pointer on the second screen (2) corresponding to the second source device 220 may be controlled.

According to an embodiment, the predetermined signal may include a signal that the input device 10 transmits to the electronic device 100 in response to a predetermined user input to the input device 10. For example, the predetermined user input may include, when the input device 10 is implemented as a mouse, keyboard, or gamepad or the like, an input through a specific button provided on the input device 10 (e.g., a specific button for changing a source device that transmits a control signal), a specific user input to the input device 10 (e.g., a triple click, a combination of some of the plurality of buttons provided on the input device 10), etc. However, the predetermined signal is of course not limited thereto.

For example, when the input device 10 is implemented as a microphone, the predetermined user input may include a particular voice input (e.g., a user's voice input uttering a particular word, etc.), and when the input device 10 is implemented as a camera, the predetermined user input may include a particular motion input (e.g., detecting the user's specific motion through the camera, etc.).

For convenience of explanation, the above example assumes that the electronic device 100 displays the first screen (1) corresponding to the first source device 210 and the second screen (2) corresponding to the second source device 220. However, this is only an example, and the present disclosure is not limited thereto.

Figure 5:
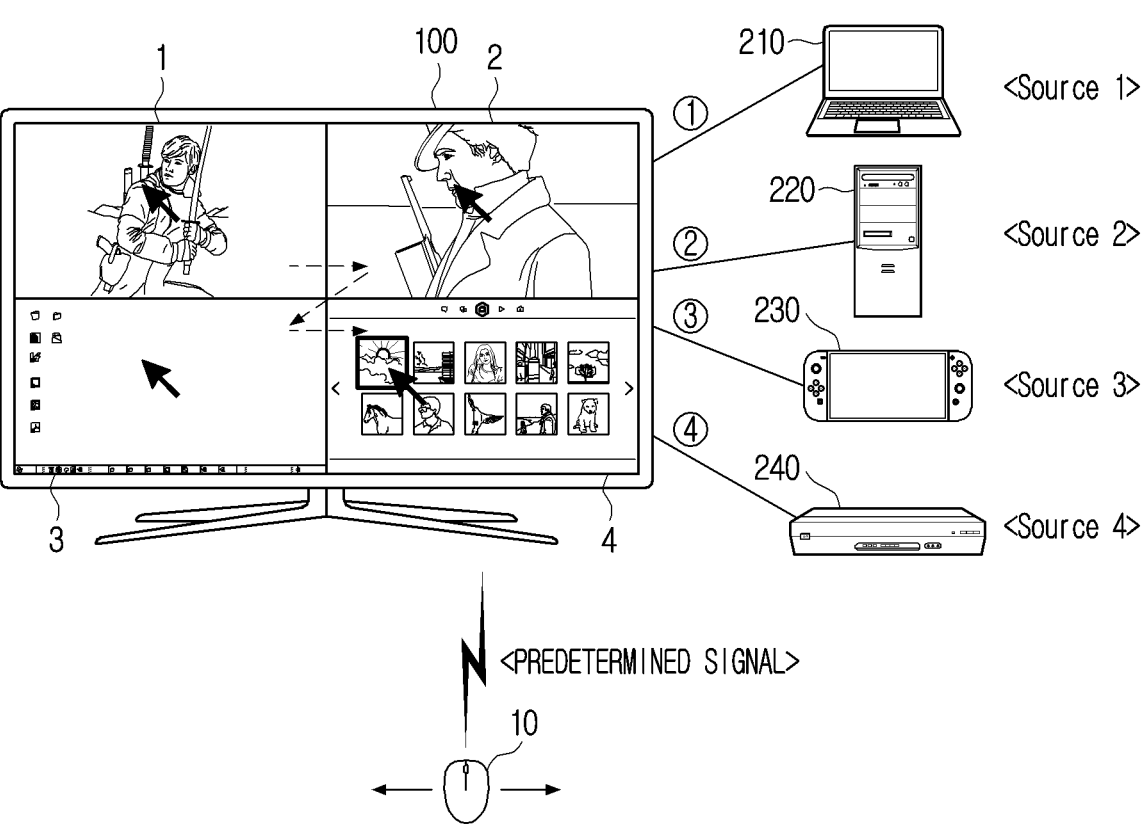
FIG. 5 is a view provided to explain an electronic device that sequentially changes source devices for transmitting a control signal according to an embodiment.

FIG. 5 is a view provided to explain an electronic device that sequentially changes source devices for transmitting a control signal according to an embodiment.

Referring to FIG. 5, the electronic device 100 may divide the display 110 into four screens, each of which may simultaneously display the first screen (1) corresponding to the first source device 210, the second screen (2) corresponding to the second source device 220, the third screen (3) corresponding to the third source device 230, and the fourth screen (4) corresponding to the fourth source device 240.

However, this is only an example, and as shown in FIG. 1, the electronic device 100 may divide the display into two, three, or more screens to simultaneously display a screen corresponding to each of the plurality of source devices 200.

According to an embodiment, the one or more processors 130 may sequentially change the source devices for transmitting a control signal according to a predetermined signal based on the time of connection of each of the first source device 210 to the fourth source device 240.

For example, when a predetermined signal is received while a control signal received from the input device 10 is transmitted to the first source device 210, the one or more processors 130 may sequentially change the source device for transmitting the control signal, from the first source device 210 to the second source device 220. Subsequently, when a predetermined signal is received while a control signal received from the input device 10 is transmitted to the second source device 220, the one or more processors 130 may sequentially change the source device for transmitting the control signal from the second source device 220 to the third source device 230.

According to an embodiment, the one or more processors 130 may change the source device for transmitting a control signal when a predetermined signal is received, based on a priority (or, change priority) for a plurality of input/output interfaces included in the communication interface 120.

For example, if the prioritization is USB Port 1→USB Port 2→HDMI Port 1, when a predetermined signal is received while a control signal received from the input device 10 is transmitted to the first source device 210 that is connected through USB Port 1, the one or more processors 130 may transmit the control signal received from the input device 10 to the first source device 210 that is connected through USB Port 1.

Subsequently, when a predetermined signal is received while a control signal received from the input device 10 is transmitted to the second source device that is connected though USB Port 2, the one or more processors 130 may transmit the control signal received from the input device 10 to the second source device 220 that is connected through USB Port 2. However, the prioritization described above is for illustrative purposes only, and the prioritization is not limited thereto. According to an embodiment, the prioritization may change depending on the specification of the electronic device 100 (e.g., a plurality of input/output interfaces provided in the electronic device 100), user or manufacturer settings, etc.

Figure 6:
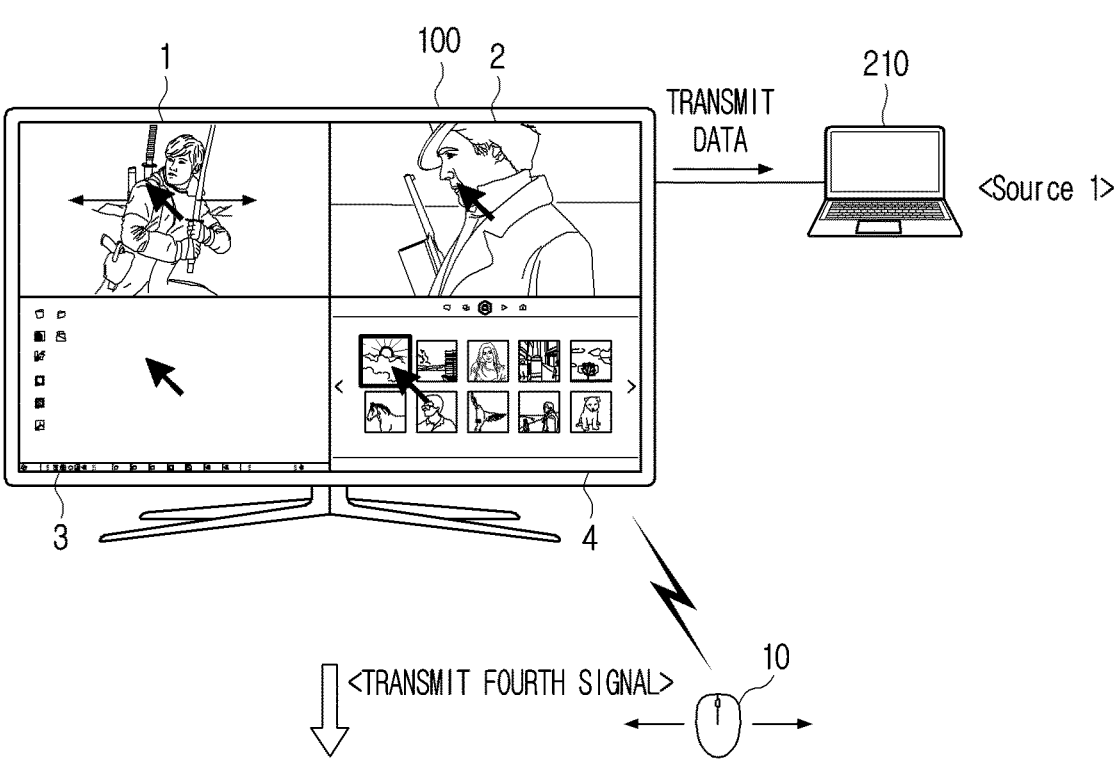
FIG. 6 is a view provided to explain a predetermined signal corresponding to each of a plurality of source devices according to an embodiment.
Figure 6:
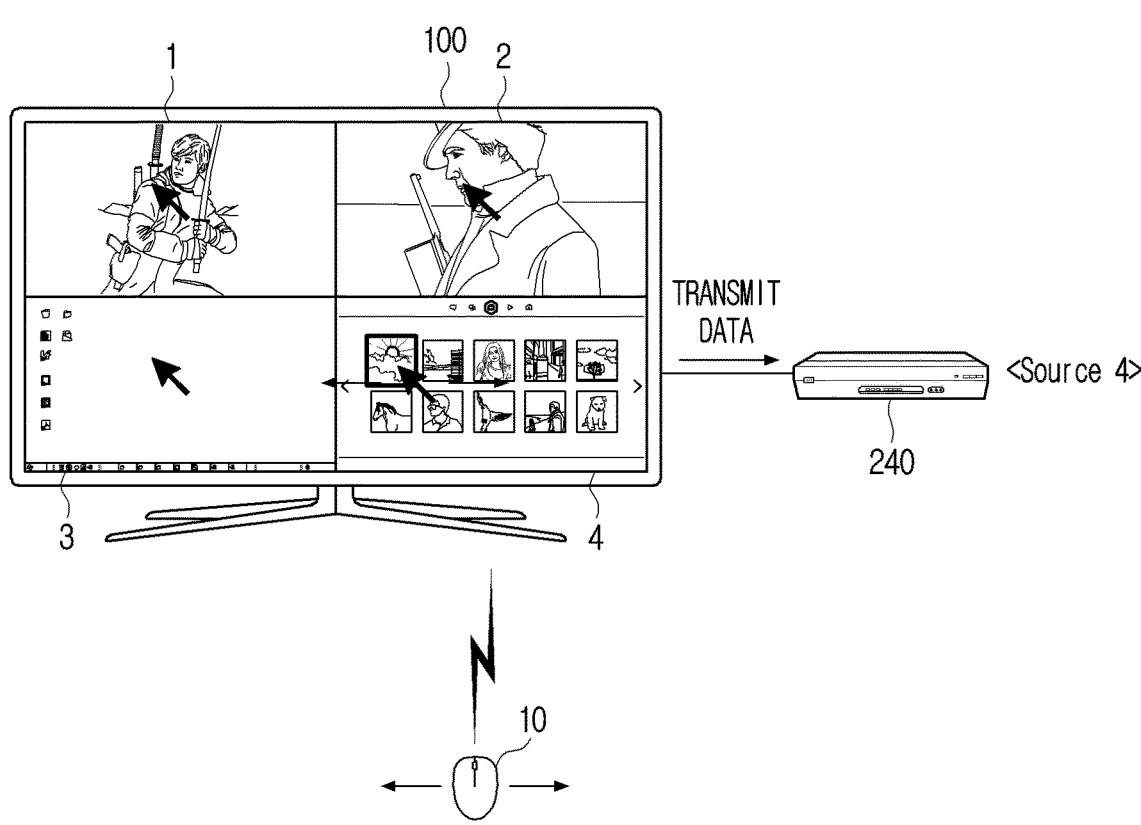

FIG. 6 is a view provided to explain a predetermined signal corresponding to each of a plurality of source devices according to an embodiment.

Referring to FIG. 6, the electronic device 100 according to an embodiment may include a memory. The memory may be implemented in the form of a memory embedded in the electronic device 100, or may be implemented in the form of a memory removably attached to the electronic device 100, depending on the usage of storage.

For example, data for driving the electronic device 100 may be stored in the memory embedded in the electronic device 100, and data for an extension function of the electronic device 100 may be stored in the memory capable of being detached from the electronic device 100. Meanwhile, when implemented as the memory embedded in the electronic device 100, the memory 130 may be implemented as at least one of a volatile memory (e.g., dynamic random access memory (DRAM), static RAM (SRAM), or synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, flash memory (e.g., NAND flash, or NOR flash), hard drive, or solid state drive (SSD)). When implemented as the memory capable of being detached from the electronic device 100, the memory 130 may be implemented in the form of a memory card (e.g., compact flash (CF), secure digital (SD), micro secure digital (Micro-SD), mini secure digital (Mini-SD), extreme digital (xD), or multi-media card (MMC)), or an external memory (e.g., USB memory) which may be connected to a universal serial bus (USB) port.

According to an embodiment, the memory may store a computer program including at least one instruction or a set of instructions for controlling the electronic device 100.

In particular, the memory may store information regarding a predetermined signal corresponding to each of the plurality of source devices 200.

For example, when a predetermined signal is received from the input device 10, the one or more processors 130 may identify a source device from among the plurality of source devices 200 corresponding to the predetermined signal based on information regarding the predetermined signal stored in the memory.

For example, the information regarding the predetermined signal may include correspondence information between a plurality of input/output interfaces and a plurality of signals.

For example, the information regarding the predetermined signal may include a first input/output interface corresponding to a first signal from among a plurality of signals, a second input/output interface corresponding to a second signal, a third input/output interface corresponding to a third signal, and the like.

According to an embodiment, the first signal may be transmitted from the input device 10 to the electronic device 100 in response to a user input to a first specific button provided on the input device 10, or a first combination comprising some of a plurality of buttons provided on the input device 10, or the like.

According to an embodiment, when the first signal is received from the input device 10, the one or more processors 130 may identify a first input/output interface (e.g., USB Port 1) corresponding to the first signal from among a plurality of input/output interfaces based on the information regarding the predetermined signal. Subsequently, the one or more processors 130 may transmit the control signal received from the input device 10 to the first source device 210 connected through the first input/output interface.

According to an embodiment, the second signal may be transmitted from the input device 10 to the electronic device 100 in response to a user input to a second specific button provided on the input device 10, or a second combination comprising some of the plurality of buttons provided on the input device 10, or the like.

According to an embodiment, when the second signal is received from the input device 10, the one or more processors 130 may identify a second input/output interface (e.g., Wi-Fi) corresponding to the second signal from among the plurality of input/output interfaces based on the information regarding the predetermined signal. Subsequently, the one or more processors 130 may transmit the control signal received from the input device 10 to a second source device 220 connected through the second input/output interface.

Referring to FIG. 6, when a fourth signal is received while a control signal received from the input device 10 is transmitted to the first source device 210, the one or more processors 130 may identify a fourth input/output interface corresponding to the fourth signal from among the plurality of input/output interfaces based on the information regarding the predetermined signal. Subsequently, the one or more processors 130 may transmit the control signal received from the input device 10 to the fourth source device 240 connected through the fourth input/output interface.

According to an embodiment, the one or more processors 130 may transmit the control signal received from the input device 10 after the fourth signal is received, to the fourth source device 240, so the fourth screen (4) corresponding to the fourth source device 240 may be changed (e.g., a pointer on the fourth screen (4) may be controlled) in response to a user input to the input device 10.

Figure 7:
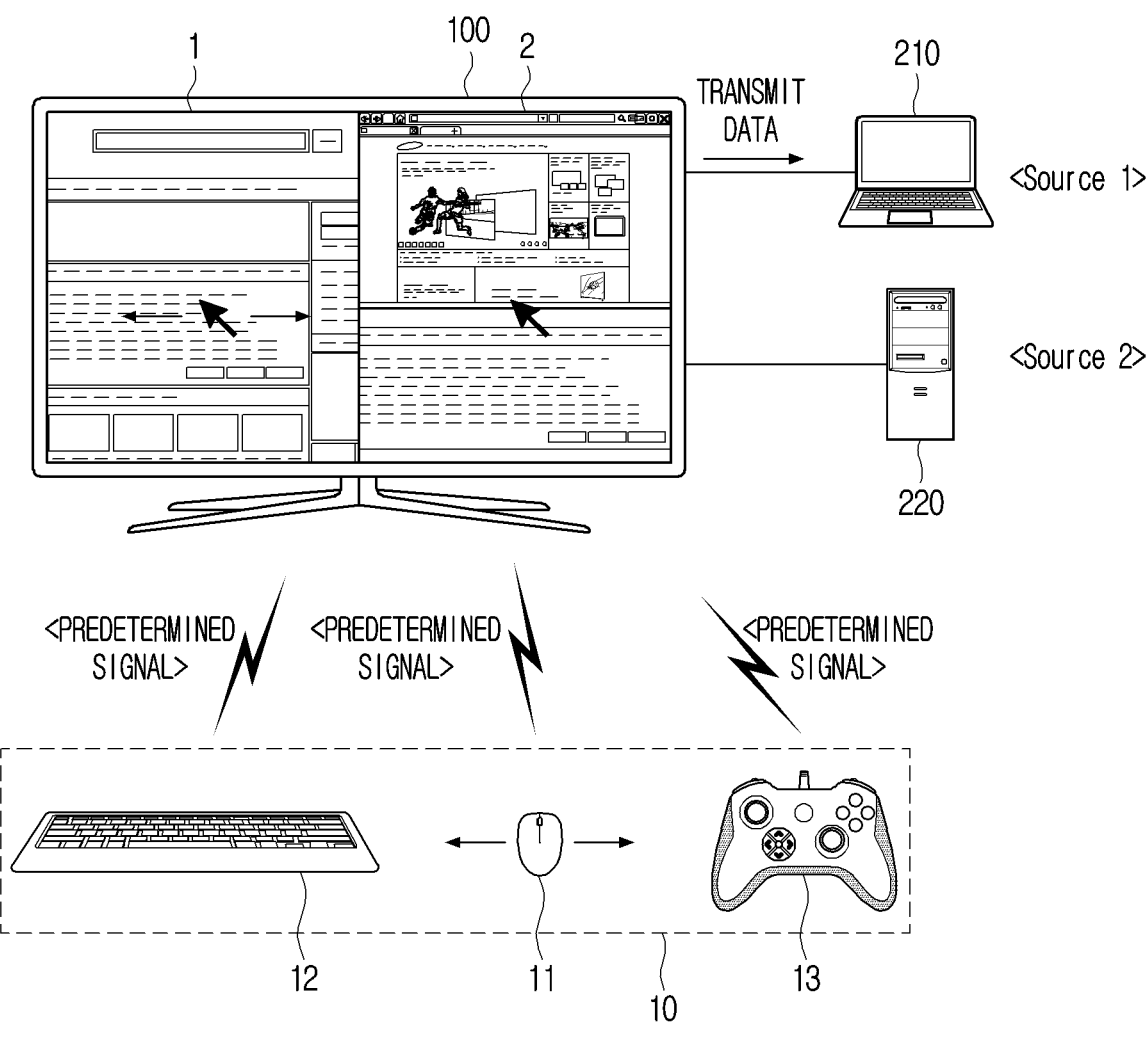
FIG. 7 is a view provided to explain a plurality of input devices according to an embodiment.

FIG. 7 is a view provided to explain a plurality of input devices according to an embodiment.

Referring to FIG. 7, the electronic device 100 may receive a predetermined signal or a control signal from each of a plurality of input devices 10.

For example, when a predetermined signal is received from one of the plurality of input devices 10, the one or more processors 130 may identify a source device for transmitting a control signal received from each of the plurality of input devices 10 based on the predetermined signal.

For example, when a predetermined signal is received from a first input device 11 from among the plurality of input devices 10, the one or more processors 130 may sequentially change a source device for transmitting a control signal received from each of the plurality of input devices 10 (e.g., change from a first source device 210 to a second source device 220). Subsequently, the one or more processors 130 may transmit the control signal received from each of the plurality of input devices 10 to the changed source device.

For example, when a first signal is received from the first input device 11 from among the plurality of input devices 10, the one or more processors 130 may identify the first source device 210 from among the plurality of source devices 200, which corresponds to the first signal based on information regarding the predetermined signal. Subsequently, the one or more processors 130 may transmit a control signal received from each of the plurality of input devices 10 to the first source device 210.

For example, the one or more processors 130 may transmit a first control signal received from the first input device 11, a second control signal received from the second input device 12, and a third control signal received from the third input device 13 to the first source device 210.

According to an embodiment, the one or more processors 130 may transmit a control signal received from each of the plurality of input devices 10 to a single source device (e.g., first source device 210). However, this is only an example, and the present disclosure is not limited thereto.

According to an embodiment, the one or more processors 130 may transmit a control signal received from each of the plurality of input devices 10 to different source devices.

According to an embodiment, when a first signal is received from a first input device 11 from among the plurality of input devices 10, the one or more processors 130 may identify the first source device 210 corresponding to the first signal based on the information regarding the predetermined signal. Subsequently, the one or more processors 130 may transmit the control signal received from the first input device 11 to the first source device 210. In addition, when a fourth signal is received from the second input device 12 from among the plurality of input devices 10, the one or more processors 130 may identify a fourth source device 240 corresponding to the fourth signal based on the information regarding the predetermined signal. Subsequently, the one or more processors 130 may transmit the control signal received from the second input device 12 to the fourth source device 240.

According to an embodiment, a first control signal received from the first input device 11 may be transmitted to the first source device 210, and a second control signal received from the second input device 12 may be transmitted to the fourth source device 240.

Figure 8:
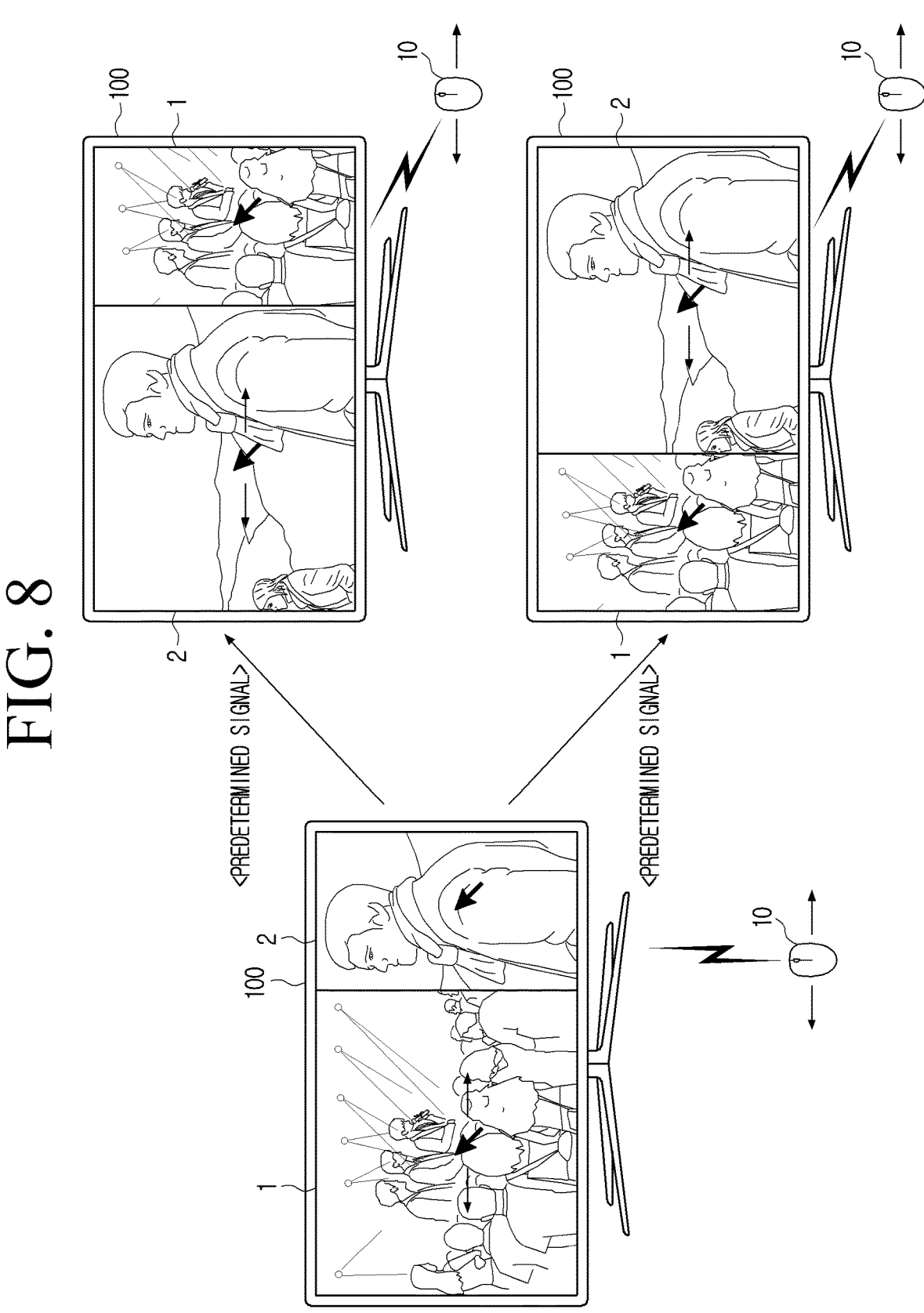
FIG. 8 is a view provided to explain an electronic device that displays a screen received from a source device for transmitting a control signal according to an embodiment.

FIG. 8 is a view provided to explain an electronic device that displays a screen received from a source device for transmitting a control signal according to an embodiment.

According to an embodiment, the one or more processors 130 may display a first screen (1) received from the first source device 210 in a first area and a second screen (2) received from the second source device 220 in a second area in a picture by picture (PBP) mode.

For example, the one or more processors 130 may divide the display 110 into two areas, a first area and a second area. Here, the first area and the second area may be equally divided (5:5), or one area (e.g., the first area) may be relatively larger than the other area (e.g., the second area).

According to an embodiment, the one or more processors 130 may divide the display 110 into a main display area and a sub display area. Here, the main display area may be relatively larger than the sub display area.

According to an embodiment, when a control signal received from the input device is transmitted to the first source device, the one or more processors 130 may display the first screen (1) corresponding to the first source device 210 in a main display area and the second screen (2) corresponding to the second source device 220 in a sub display area.

According to an embodiment, when a predetermined signal (or a second signal corresponding to the second source device 220) is received while a control signal received from the input device 10 is transmitted to the first source device 210, the one or more processors 130 may change the source device for transmitting the control signal from the first source device 210 to the second source device 220. Subsequently, the one or more processors 130 may display the first screen (1) corresponding to the first source device 210 in the sub display area, and the second screen (2) corresponding to the second source device 220 in the main display area.

However, this is only an example, and the present disclosure is not limited thereto. For example, as shown in the lower portion of FIG. 8, when the source device for transmitting the control signal received from the input device 10 changes from the first source device 210 to the second source device 220, the one or more processors 130 may change the size of the first area on which the first screen (1) corresponding to the first source device 210 is displayed to be relatively smaller than the size of the second area on which the second screen (2) corresponding to the second source device 220 is displayed.

Figure 9:
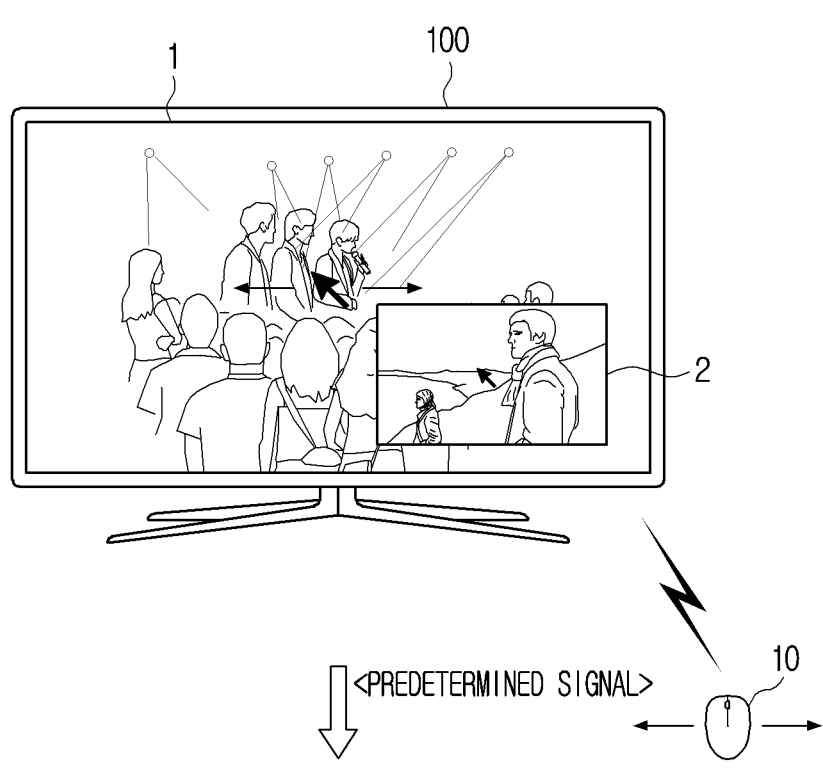
FIG. 9 is a view provided to explain a Picture In Picture (PIP) mode according to an embodiment.
Figure 9:
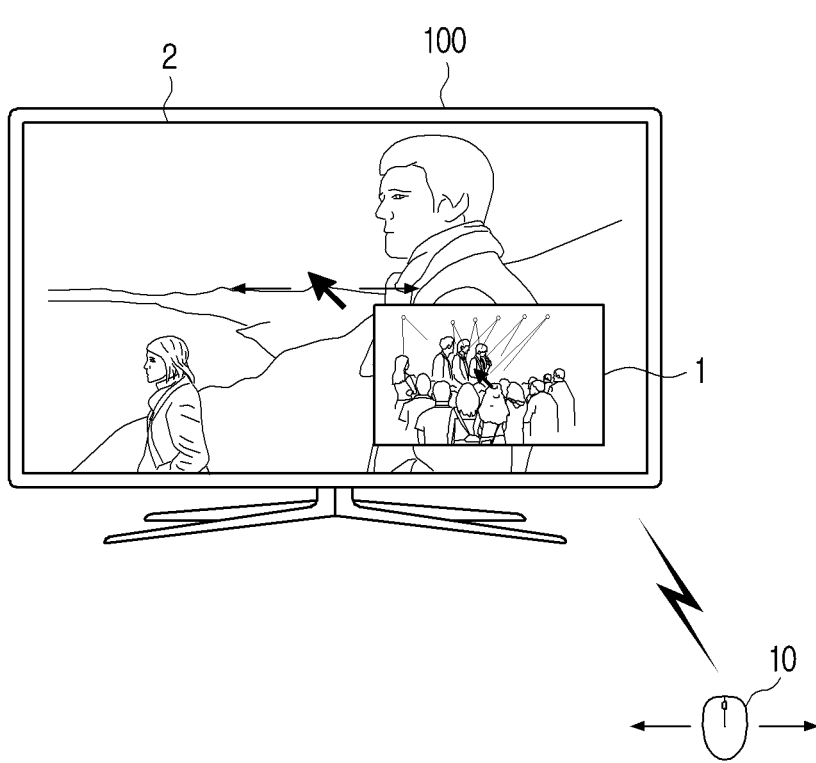

FIG. 9 is a view provided to explain a Picture In Picture (PIP) mode according to an embodiment.

According to an embodiment, the one or more processors 130 may display the first screen (1) received from the first source device 210 as a full screen and the second screen (2) received from the second source device 220 as a pop-up screen in a picture by picture (PIP) mode. Here, the full screen may be referred to as the main display area and the pop-up screen may be referred to as the sub display area.

For example, when a predetermined signal is received from the input device 10, the one or more processors 130 may identify any one source devices for transmitting the control signal received from the input device 10 based on the predetermined signal. For example, the one or more processors 130 may transmit the control signal to the first source device 210 or the second source device 220 based on the predetermined signal.

According to an embodiment, when a predetermined signal (or a second signal corresponding to the second source device 220) is received while a control signal received from the input device 10 is transmitted to the first source device 210, the one or more processors 130 may change the source device for transmitting the control signal from the first source device 210 to the second source device 220. Subsequently, the one or more processors 130 may display the first screen (1) corresponding to the first source device 210 in a pop-up screen, and the second screen (2) corresponding to the second source device 220 in a full screen.

According to an embodiment, the one or more processors 130 may transmit a control signal received from the input device 10, which is received after a predetermined signal is received, to the second source device 220, and in response to a user input to the input device 10, a pointer on the full screen on which the second screen (2) corresponding to the second source device 220 is displayed may be controlled.

Figure 10:
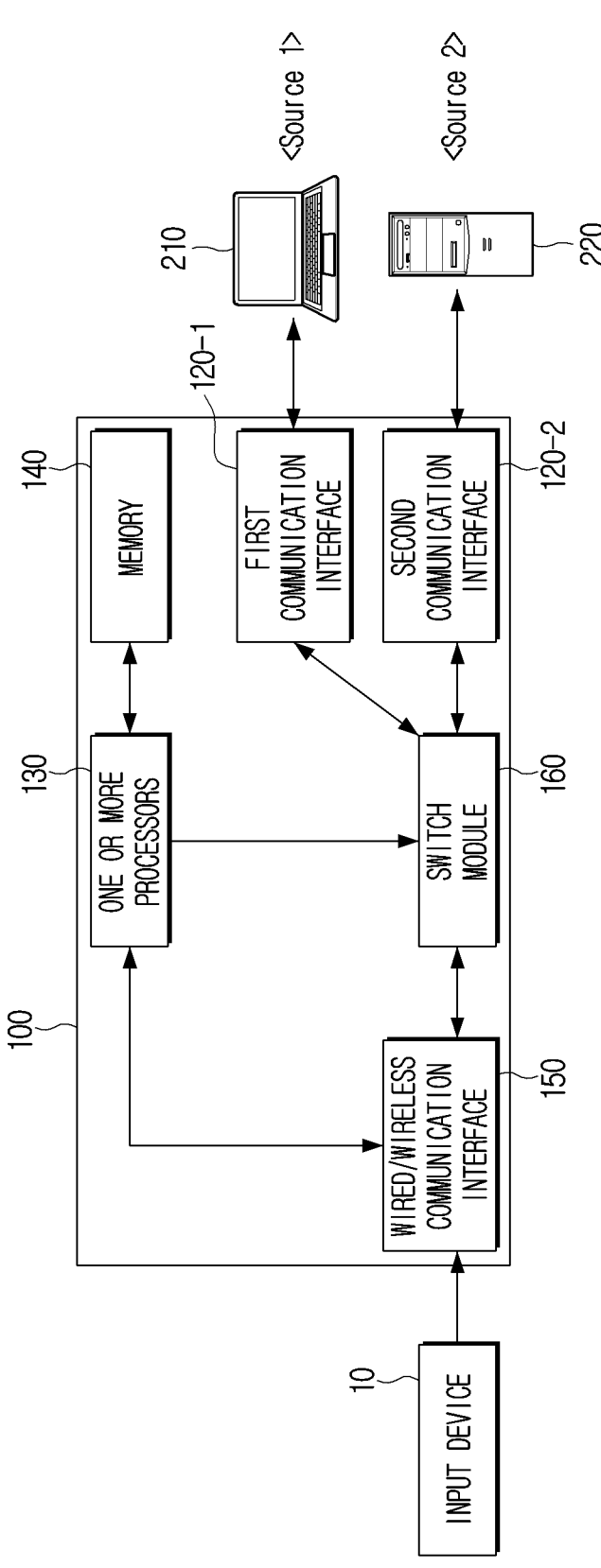
FIG. 10 is a detailed block diagram provided to explain configuration of an electronic device according to an embodiment.

FIG. 10 is a detailed block diagram provided to explain configuration of an electronic device according to an embodiment.

In the description of FIG. 10, descriptions overlapping with those of FIG. 2 are omitted.

Referring to FIG. 10, the electronic device 100 may further include a memory 140, a wired and wireless communication interface 150, and a switch module 160.

According to an embodiment, the memory 140 may store information regarding a predetermined signal corresponding to each of the plurality of source devices 200.

In some examples, the wired and wireless communication interface 150 may include wired or wireless input/output interfaces (or input/output terminals) according to various standards. For example, the wired and wireless communication interfaces 150 may include HDMI (High Definition Multimedia Interface), MHL (Mobile High-Definition Link), USB (Universal Serial Bus), DP (Display Port), Thunderbolt, VGA (Video Graphics Array) port, RGB port, D-SUB (D-subminiature), DVI (Digital Visual Interface) AP-based Wi-Fi (Wi-Fi, Wireless LAN network), Bluetooth, Zigbee, wired/wireless local area network (LAN), wide area network (WAN), Ethernet, IEEE 1394, Audio Engineering Society/European Broadcasting Union (AES/EBU), optical, coaxial, and more.

According to an embodiment, the input device 10 may be paired with the electronic device 100 through the wired or wireless communication interface 150.

When a predetermined signal is received from the paired input device 10, the one or more processors 130 may identify any one source device corresponding to the predetermined signal.

For example, the one or more processors 130 may receive a predetermined signal by performing wireless communication (e.g., Bluetooth pairing) with the input device 10, and may receive a control signal by performing wired communication (e.g., USB port) with the input device 10. However, this is only an example, and the one or more processors 130 may receive a predetermined signal and a control signal through either wireless communication or wired communication.

According to an embodiment, the switching module 160 may transmit a control signal to any one of the plurality of input/output interfaces included in the communication interface 120 under the control of the one or more processors 130.

For example, when the first source device 210 corresponding to a predetermined signal is identified, the one or more processors 130 may control the switch module 160 to transmit the control signal received from the input device 10 to the first source device 210 through the first communication interface 120-1. Alternatively, when the second source device 220 corresponding to a predetermined signal is identified, the one or more processors 130 may control the switch module 160 to transmit the control signal received from the input device 10 to the second source device 220 through the second communication interface 120-2.

According to an embodiment, the switch module 160 may be referred to as a KVM switch, a KM switch, or the like. A KVM switch is a keyboard, video and mouse switch. According to an embodiment, the switch module 160 may be a component of the communication interface 120 or a component independent of the communication interface 120.

According to an embodiment, the one or more processors 130 may control the switch module 160 to output content provided by each of the plurality of source devices 200 and transmit a user input to each of the plurality of source devices 200 without an output device (e.g., monitor) and the input device 10 (e.g., keyboard, mouse, etc.) corresponding to each of the plurality of source devices 200.

For example, the one or more processors 130 may control the switch module 160 in response to a predetermined signal to display content provided by at least one source device from among the plurality of source devices 200 through the display 110, and transmit a user input (or, a control signal) for the input device 10 to the at least one source device from among the plurality of source devices 200.

Accordingly, the one or more processors 130 can control the switch module 160 in response to a predetermined signal to easily switch between source devices providing content for display through the display 110 and source devices for control through the input device 10.

When a source device for transmitting the control signal received from the input device 10 in response to the predetermined signal is changed from the first source device 210 to the second source device, the one or more processors 130 according to an embodiment may, after positioning the pointer at an initial position within the second screen (2), move the position of the pointer based on the control signal received from the input device 10.

According to an embodiment, a pointer that moves in response to user input may move according to a control signal after being positioned at an initial position within a screen (e.g., second screen (2)) corresponding to the second image signal received from the second source device 220.

Here, the initial position may include a center within the second screen (2). The control signal received from the input device 10 may include coordinate information for moving the pointer.

When the source device for transmitting the control signal received from the input device 10 is changed from the first source device 210 to the second source device 220 based on the predetermined signal, the one or more processors 130 according to an embodiment may store the current position of the first pointer in the first screen (1) in the memory 140 and load the previous position of the second pointer in the second screen (2) from the memory 140.

Here, the previous position may indicate the current position of the second pointer within the second screen (2) stored in the memory 140 at the time when the source device for transmitting the control signal changes from the second source device to another source device (e.g., the first source device).

The one or more processors may move the position of the second pointer based on the control signal received from the input device 10 after positioning the second pointer at a location before loading.

According to an embodiment, the second pointer that moves in response to the user input may move in response to the control signal after being positioned at a previous position on the screen corresponding to the second image signal.

Figure 11:
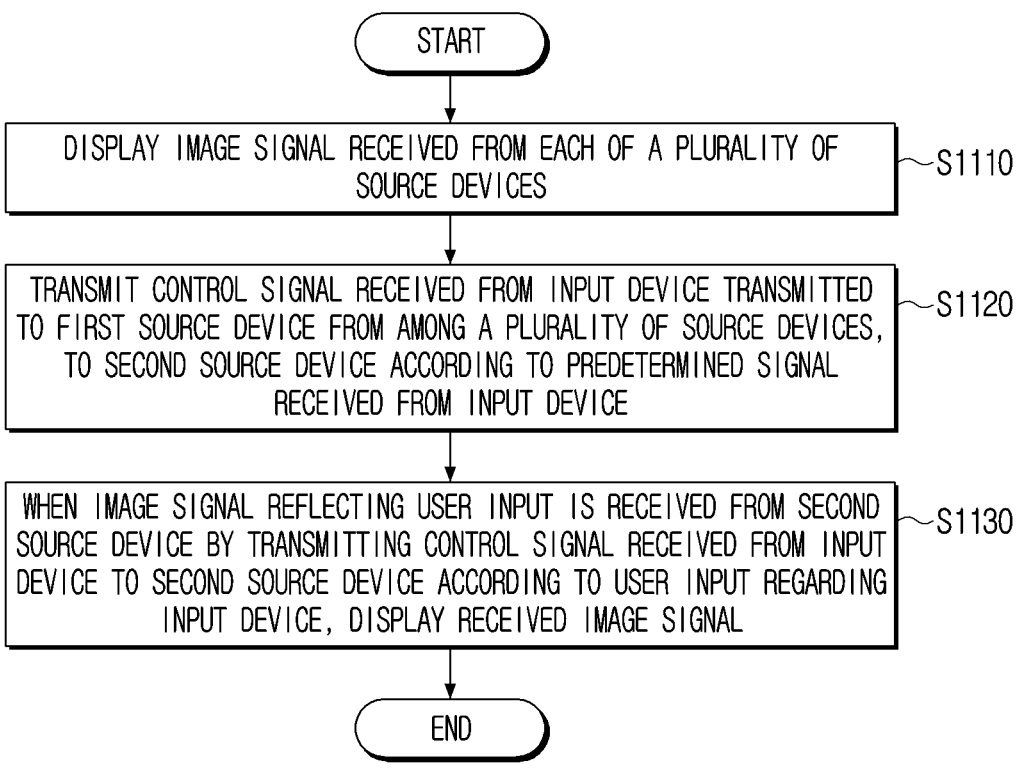
FIG. 11 is a block diagram provided to explain a controlling method of an electronic device according to an embodiment.

FIG. 11 is a block diagram provided to explain a controlling method of an electronic device according to an embodiment.

A controlling method of an electronic device according to an embodiment first displays an image signal received from each of a plurality of source devices (S1110).

Subsequently, according to a predetermined signal received from the input device, the control signal received from the input device transmitted to the first source device from among the plurality of source devices is transmitted to the second source device (S1120).

Then, in accordance with the user input to the input device, the control signal received from the input device is transmitted to the second source device, and when the image signal reflecting the user input is received from the second source device, the received image signal is displayed (S1130).

According to an embodiment, the step S1120 of transmitting may include: when a predetermined signal is received while a control signal is transmitted to the first source device, changing the source device for transmitting the control signal from the first source device to the second source device and transmitting the control signal to the second source device; and when a predetermined signal is received while the control signal is transmitted to the second source device, changing the source device for transmitting the control signal from the second source device to the third source device and transmitting the control signal to the third source device.

According to an embodiment, the step S1120 of transmitting may include: when a predetermined first signal is received from the input device, identifying a first source device corresponding to the predetermined first signal based on information regarding a predetermined signal corresponding to each of the plurality of source devices, and transmitting a control signal to the first source device; and when a predetermined second signal is received from the input device, identifying a second source device corresponding to the predetermined second signal based on the information, and transmitting a control signal to the second source device.

According to an embodiment, the step S1120 of transmitting may include when a predetermined signal is received from the input device paired with the electronic device, controlling a switch module to switch the source device for transmitting a control signal from the first source device to the second source device, and the controlling the switch module may include transmitting the control signal to a port corresponding to the second source device from among a plurality of ports provided on the electronic device.

According to an embodiment, the step S1120 of transmitting may include, when a predetermined signal is received from at least one input device from among the plurality of input devices, switching the source device for transmitting the control signal received from each of the plurality of input devices from the first source device to the second source device based on the predetermined signal and transmitting the control signal received from each of the plurality of input devices to the second source device.

According to an embodiment, the step S1120 of transmitting may include, when a predetermined signal is received from the first input device from among the plurality of input devices while the control signal is transmitted to the first source device, sequentially changing the source device for transmitting the control signal from the first source device to the second source device.

According to an embodiment, the step S1130 of displaying may include, when the control signal is transmitted to the first source device, displaying the image signal received from the first source device in a main display area and displaying the image signal received from the remaining source devices from among the plurality of source devices in a sub display area.

According to an embodiment, the step S1110 of displaying the screen received from each of the plurality of source devices may further include distinguishing between a main display area and a sub display area according to a picture by picture (PBP) mode or a picture in picture (PIP) mode.

According to an embodiment, the input device includes a mouse, and the step S1110 of displaying the image signal received from each of the plurality of source devices includes displaying each of a first image signal received from the first source device and a second image signal received from the second source device, according to a predetermined signal, when the source device for transmitting the control signal received from the mouse is changed from the first source device to the second source device, the pointer moving in response to the user input moves in accordance with the control signal after being positioned at an initial position in the screen corresponding to the second image signal, and the control signal may include coordinate information for moving the pointer.

According to an embodiment, the input device includes a mouse, and the step S1110 of displaying the image signal received from each of the plurality of source devices includes displaying a first image signal received from the first source device and a second image signal received from the second source device, and the step S1130 of displaying the received image signal includes, when the source device for transmitting the control signal received from the mouse changes from the first source device to the second source device, storing the current position of the first pointer in the screen corresponding to the first image signal and loading a previous position of the second pointer in the screen corresponding to the second image signal, the second pointer moving in response to the user input moves in response to the control signal after being positioned at the previous position in the screen corresponding to the second image signal, and the control signal may include coordinate information for moving the pointer.

Various embodiments of the present disclosure may be applied to many different types of electronic devices capable of outputting content as well as electronic devices.

Meanwhile, the various embodiments described above may be implemented in a computer or a recording medium readable by a computer or a similar device using software, hardware, or a combination of software and hardware. In some cases, the embodiments described in the specification may be implemented by a processor itself. According to software implementation, the embodiments such as the procedures and functions described in the specification may be implemented by separate software modules. Each of the software modules may perform one or more functions and operations described in the specification.

Meanwhile, computer instructions for performing processing operations of the electronic device 100 according to the various embodiment of the disclosure described above may be stored in a non-transitory computer-readable medium. The computer instructions stored in the non-transitory computer-readable medium may allow a specific device to perform the processing operations of the electronic device 100 according to the various embodiments described above in case that the computer instructions are executed by a processor of the specific device.

The non-transitory computer-readable medium is not a medium that stores data therein for a while, such as a register, a cache, or a memory, and indicates a medium that semi-permanently stores data therein and is readable by a device. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic device comprising:

a display;

a communication interface configured to perform communication with a plurality of source devices; and one or more processors configured to:

control the display to display an image signal received from each of the plurality of source devices;

according to a predetermined signal received from an input device, control the communication interface so that the communication interface previously controlled to transmit a control signal received from the input device to a first source device from among the plurality of source devices is controlled to transmit the control signal to a second source device from among the plurality of source devices instead of the first source device;

based on the control signal being received from the input device according to a user input regarding the input device, transmit the control signal to the second source device; and based on an image signal reflecting the user input being received from the second source device, control the display to display the received image signal from the second source device along with the received image signal from remaining source devices from among the plurality of source devices.

2. The device as claimed in claim 1, wherein the one or more processors are configured to:

based on the predetermined signal being received while the control signal is transmitted to the first source device, change a source device for transmitting the control signal from the first source device to the second source device and transmit the control signal to the second source device; and based on the predetermined signal being received while the control signal is transmitted to the second source device, sequentially change a source device for transmitting the control signal from the second source device to a third source device from among the plurality of source devices and transmit the control signal to the third source device.

3. The device as claimed in claim 1, further comprising:

a memory configured to store information regarding a predetermined signal corresponding to each of the plurality of source devices, wherein the one or more processors are configured to:

based on a predetermined first signal being received from the input device, identify the first source device corresponding to the predetermined first signal based on the information and transmit the control signal to the first source device; and based on a predetermined second signal being received from the input device, identify the second source device corresponding to the predetermined second signal based on the information and transmit the control signal to the second input device.

4. The device as claimed in claim 1, wherein the communication interface comprises a switch circuitry;

wherein the electronic device further comprises a wireless communication interface;

wherein the one or processors are configured to, based on the predetermined signal being received from the input device paired with the electronic device through the wireless communication interface, control the switch circuitry to switch a source device for transmitting the control signal from the first source device to the second source device; and wherein the switch circuitry is configured to transmit the control signal to a port corresponding to the second source device from among a plurality of ports constituting the communication interface under a control of the one or more processors.

5. The device as claimed in claim 1, wherein the one or more processors are configured to:

based on the predetermined signal being received from at least one input device from among a plurality of input devices, control the communication interface to switch a source device for transmitting a control signal received from each of the plurality of input devices from the first source device to the second source device based on the predetermined signal; and transmit the control signal received from each of the plurality of input devices to the second source device.

6. The device as claimed in claim 5, wherein the one or more processors are configured to:

based on the predetermined signal being received from a first input device from among the plurality of input devices while the control signal is transmitted to the first source device, sequentially change a source device for transmitting the control signal from the first source device to the second source device; and transmit the control signal to the second source device.

7. The device as claimed in claim 1, wherein the one or more processors are configured to:

divide the display into a main display area and a sub display area;

based on the control signal being transmitted to the first source device, display an image signal received from the first source device on the main display area; and display an image signal received from remaining source devices from among the plurality of source devices on the sub display area.

8. The device as claimed in claim 7, wherein the one or more processors are configured to distinguish the main display area and the sub display area according to a Picture By Picture (PBP) mode or a Picture In Picture (PIP) mode.

9. The device as claimed in claim 1, wherein the input device comprises a mouse;

wherein the one or more processors are configured to:

control the display to display each of a first image signal received from the first source device and a second image signal received from the second source device;

wherein, based on a source device for transmitting the control signal received from the mouse being changed from the first source device to the second source device based on the predetermined signal, a pointer moving in response to the user input moves according to the control signal after being positioned at an initial position on a screen corresponding to the second image signal;

wherein the control signal includes coordinate information for moving the pointer.

10. The device as claimed in claim 1, wherein the input device includes a mouse;

wherein the one or more processors are configured to:

control the display to display each of the first image signal received from the first source device and the second image signal received from the second source device; and based a source device for transmitting the control signal received from the mouse being changed from the first source device to the second source device based on the predetermined signal, store a current position of a first pointer on a screen corresponding to the first image signal and load a previous position of a second pointer on a screen corresponding to the second image signal;

wherein the second pointer moving in response to the user input moves according to the control signal after being positioned at the previous position on the screen corresponding to the second image signal; and wherein the control signal includes coordinate information for moving the pointer.

11. A controlling method of an electronic device including a display, and a communication interface configured to perform communication with a plurality of source devices, the method comprising:

controlling the display an image signal received from each of the plurality of source devices;

according to a predetermined signal received from an input device, controlling the communication interface so that the communication interface previously controlled to transmit a control signal received from the input device to a first source device from among plurality of source devices, is controlled to transmit the control signal to a second source device from among the plurality of source devices instead of the first source device; and based on the control signal being received from the input device according to a user input regarding the input device, transmitting the control signal to the second source device, and based on an image signal reflecting the user input being received from the second source device, controlling the display to display the received image signal from the second source device along with the received image signal from remaining source devices from among the plurality of source devices.

12. The method as claimed in claim 11, wherein the transmitting of the control signal comprises:

based on the predetermined signal being received while the control signal is transmitted to the first source device, changing a source device for transmitting the control signal from the first source device to the second source device and transmitting the control signal to the second source device; and based on the predetermined signal being received while the control signal is transmitted to the second source device, changing a source device for transmitting the control signal from the second source device to a third source device from among the plurality of source devices and transmitting the control signal to the third source device.

13. The method as claimed in claim 11, wherein the transmitting of the control signal comprises:

based on a predetermined first signal being received from the input device, identifying the first source device corresponding to the predetermined first signal based on information regarding the predetermined signal corresponding to each of the plurality of source devices and transmitting the control signal to the first source device; and based on a predetermined second signal being received from the input device, identifying the second source device corresponding to the predetermined second signal based on the information and transmitting the control signal to the second source device.

14. The method as claimed in claim 11, wherein the communication interface includes a switch circuitry, and the transmitting of the control signal comprises:

based on the predetermined signal being received from the input device paired with the electronic device, controlling the switch circuitry to switch a source device for transmitting the control signal from the first source device to the second source device;

wherein the controlling the switch circuitry comprises transmitting the control signal to a port corresponding to the second source device from among a plurality of ports provided in the electronic device.

15. A method as claimed in claim 11, wherein the transmitting of the control signal comprises:

based on the predetermined signal being received from at least one input device from among a plurality of input devices, switching a source device for transmitting a control signal received from each of the plurality of input devices from the first source device to the second source device based on the predetermined signal; and transmitting the control signal received from each of the plurality of input devices to the second source device.

16. An electronic device comprising:

a display configured to simultaneously display image signals received from a plurality of source devices;

a communication interface which is controllable to be in a plurality of configurations to respectively transmit control signals received from an input device to the plurality of source devices and so that, when the communication interface is in a respective configuration of the plurality of configurations to transmit control signals received from the input device to a respective source device of the plurality of source devices, the communication interface does not transmit the control signals received from the input device to other source devices of the plurality of source devices; and at least one processor configured to, when the display is simultaneously displaying image signals received from a first source device of the plurality of source devices and a second source device of the plurality of source devices and the communication interface is in a first configuration of the plurality of configurations to transmit control signals received from the input device to the first source device and not the second source device, and a predetermined signal is received from the input device;

control the communication interface to be in a second configuration of the plurality of configurations so that the communication interface transmits control signals received from the input device to the second source device and not the first source device, and based on a control signal being received from the input device when the communication interface is in the second configuration, control the communication interface to transmit the control signal to the second source device.

17. The electronic device as claimed in claim 16, wherein the at least one processor is configured to, when the display is simultaneously displaying image signals received from the first source device, the second source device, and a third source device of the plurality of source devices, and the communication interface is in the second configuration to transmit control signals received from the input device to the second source device and not the first source device or the third source device, and the predetermined signal is received from the input device;

control the communication interface to change sequentially to be in a third configuration of the plurality of configurations so that the communication interface transmits control signals received from the input device to the third source device and not the first source device or the second source device, and based on a control signal being received from the input device when the communication interface is in the third configuration, control the communication interface to transmit the control signal to the third source device.

18. The electronic device as claimed in claim 16, wherein the predetermined signal is a predetermined signal of a plurality of predetermined signals respectively corresponding to the plurality of source devices, and the at least one processor is configured to:

based on a first predetermined signal of the plurality of predetermined signals being received from the input device, identify the first source device corresponding to the first predetermined signal and control the communication interface to be in the first configuration, and based on a second predetermined signal of the plurality of predetermined signals being received from the input device, identify the second source device corresponding to the second predetermined signal and control the communication interface to be in the second configuration.

19. The electronic device as claimed in claim 16, wherein the electronic device further comprises a wireless communication interface, the communication interface includes a switch circuitry and a plurality of ports, and the at least one processor is configured to, when the display is simultaneously displaying image signals received from the first source device and the second source device, the communication interface is in the first configuration, the input device is paired with the electronic device via the wireless communication interface, and the predetermined signal is received from the input device through the wireless communication interface, control the communication interface to be in the second configuration such that the switch circuitry switches from transmitting control signals received from the input device to a port among the plurality of ports corresponding to the first source device to transmitting control signals received from the input device to a port among the plurality of ports corresponding to the second source device.

20. The electronic device as claimed in claim 16, wherein the input device is an input device among a plurality of input devices, and the at least one processor is configured to, when the display is simultaneously displaying image signals received from the first source device and the second source device, the communication interface is in the first configuration so that the communication interface transmits control signals received from any input device among the plurality of input devices to the first source device and not the second source device, and the predetermined signal is received from at least one input device among the plurality of input devices, control the communication interface to be in the second configuration so that the communication interface transmits control signals received from any input device among the plurality of input devices to the second source device and not the first source device, and based on a control signal being received from any input device among the plurality of input devices when the communication interface is in the second configuration, control the communication interface to transmit the control signal to the second source device.

* * * * *